United States Patent Office 3,121,725
Patented Feb. 18, 1964

3,121,725
N-HETEROCYCLIC SULFIDES, SULFOXIDES, SULFONES, AND N-OXIDES OF SAID SULFOXIDES AND SULFONES
Anton M. Schnitzer, Bartlesville, Okla., assignor to Phillips Petroleum Company, a corporation of Delaware
No Drawing. Filed July 18, 1960, Ser. No. 43,299
10 Claims. (Cl. 260—294.8)

This invention relates to novel N-heterocyclic sulfides, sulfoxides, sulfones and N-oxides of said sulfoxides and sulfones and to a method for making these compounds. In one aspect, this invention relates to a method of preparing sulfoxides, sulfones and N-oxides of sulfoxides and sulfones by contacting a sulfide selected from the group consisting of pyridyl sulfides, quinolyl sulfides, di(pyridyl) sulfides and di(quinolyl) sulfides with an oxidizing agent under oxidizing conditions. In another aspect, this invention relates to compounds formed by contacting pyridyl sulfides, quinolyl sulfides, di(pyridyl) sulfides, and di(quinolyl) sulfides with an oxidizing agent to form sulfoxides, sulfones, and N-oxides of sulfoxides and sulfones of these sulfides. In another aspect, this invention relates to a method of preparing sulfoxides, sulfones, and N-oxides of sulfoxides and sulfones by reacting a vinyl-substituted N-heterocyclic compound with a compound selected from hydrogen sulfide and an alkyl mercaptan to form a sulfide and subsequently oxidizing said sulfide. In another aspect, this invention relates to novel sulfides containing 1-(3-pyridyl)ethyl, 1-(5-pyridyl)ethyl and 1-(3-quinolyl)ethyl groups, and alkyl-substituted derivatives thereof wherein the alkyl groups are attached to carbons of the heterocyclic ring.

The novel compounds according to my invention are useful as insecticides and fungicides and can be used alone or in a mixture with other known insecticidal and fungicidal agents.

It is an object of this invention to provide new and useful sulfides containing 1-(3-pyridyl)ethyl, 1-(5-pyridyl)ethyl and 1-(3-quinolyl)ethyl groups, and sulfoxides, sulfones and N-oxides of sulfoxides and sulfones of N-heterocyclic compounds. It is another object of this invention to provide an improved method for the preparation of sulfoxides, sulfones and N-oxides of sulfoxides and sulfones of N-heterocyclic compounds.

Other aspects, objects and the several advantages of this invention will be apparent from a study of this disclosure and the appended claims.

According to this invention, there are provided new compounds comprising sulfides containing 1-(3-pyridyl) ethyl, 1-(5-pyridyl)ethyl and 1-(3-quinolyl)ethyl groups. Also, according to this invention there are provided methods for preparing sulfoxides, sulfones and N-oxides of sulfoxides and sulfones of N-heterocyclic compounds. Also, according to this invention, there are provided new compounds comprising sulfoxides, sulfones and N-oxides of sulfoxides and sulfones of N-heterocyclic compounds. Also, according to this invention, there are provided methods for preparing such oxygen containing compounds by reacting vinyl-substituted N-heterocyclic compounds with hydrogen sulfide or alkyl mercaptan to form a sulfide and subsequently oxidizing the sulfide by contacting with an oxidizing agent selected from the group consisting of hydrogen peroxide and aliphatic peracids.

The reaction of hydrogen sulfide or mercaptans with olefins has been investigated by many researchers. For example, it is known that 2-vinylpyridine react with hydrogen sulfide to yield, depending upon the ratio of reactants, either 2-mercaptoethylpyridine, or di(2-[2-pyridyl]ethyl)sulfide.

I have found, however, that 3-vinylpyridines and 5-vinylpyridines, for example, 2-methyl-5-vinylpyridine, behave somewhat differently than 2-vinylpyridines and 4-vinylpyridines. When 2-methyl-5-vinylpyridine is reacted with hydrogen sulfide, the corresponding 2-methyl-5-mercaptoethylpyridine is not formed, and only the sulfide is formed. Contrary to the sulfide formed by the reaction of 2-vinylpyridine with the proper amount of $H_2S$, the sulfide from 2-methyl-5-vinylpyridine is formed by the attachment of the sulfur at the carbon closest to the heterocyclic ring.

I have now discovered that the sulfides formed by the reaction of a vinyl-substituted N-heterocyclic compound with hydrogen sulfide and alkyl mercaptans can be oxidized to the corresponding sulfoxides and sulfones, and the N-oxides of these sulfoxides and sulfones.

The vinyl-substituted heterocyclic compounds which are converted to sulfides by the reaction with $H_2S$ or alkyl mercaptans as contemplated herein are vinylpyridines, vinylquinolines and the alkyl derivatives of these compounds wherein one or more alkyl groups, containing up to a total of 10 carbon atoms, can be present. These compounds are reacted with $H_2S$ or an alkyl mercaptan containing from 1 to 12 carbon atoms. This reaction can be carried out at ambient temperatures and atmospheric pressure, but it is preferred to utilize temperatures above 100° F. and pressures above 50 p.s.i.g. The pressure should be sufficient to maintain the N-heterocyclic compound in the liquid phase at the reaction temperature.

The sulfides which are produced by this reaction, and which are oxidized to sulfoxides, sulfones, etc., according to the method of this invention have the following structural characteristics:

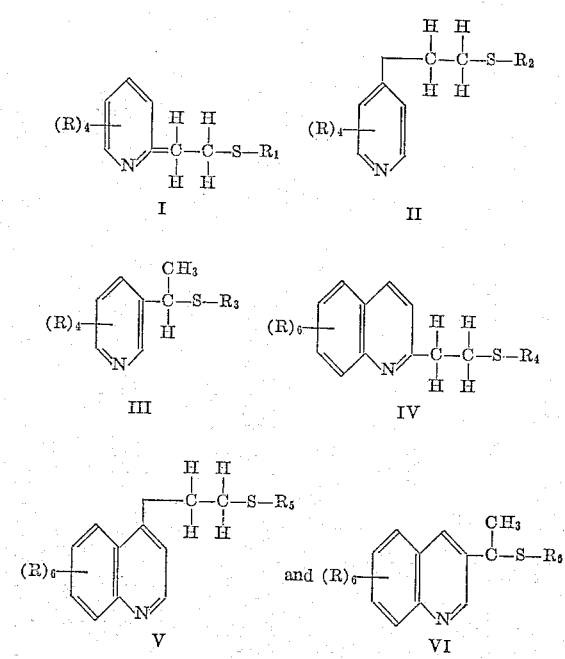

wherein R is selected from the group of hydrogen and one or more alkyl groups containing a total of not more than 12 carbon atoms, $R_1$ is selected from the group consisting of

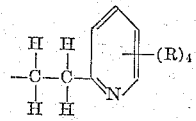

and an alkyl radical containing from 1 to 12 carbon atoms; $R_2$ is selected from the group consisting of

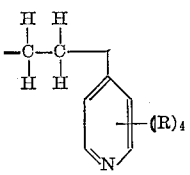

and an alkyl radical containing from 1 to 12 carbon atoms; $R_3$ is selected from the group consisting of

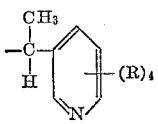

and a 1 to 12 carbon alkyl; $R_4$ is selected from the group consisting of

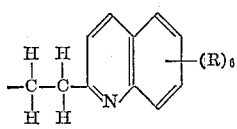

and a 1 to 12 carbon alkyl; $R_5$ is selected from the group consisting of

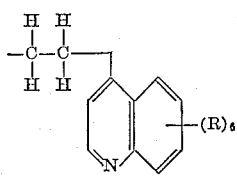

and a 1 to 12 carbon alkyl; and $R_6$ is selected from the group consisting of

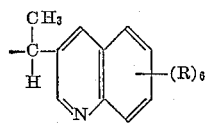

and a 1 to 12 carbon alkyl.

Some specific examples of the above described sulfides which can be oxidized according to the method of this invention are:

Di(1-[2-methyl-5-pyridyl]ethyl) sulfide
Di(2-[5-n-butyl-2-pyridyl]ethyl) sulfide
Di(2-[4-pyridyl]ethyl) sulfide
(2-[4-n-decyl-2-pyridyl]ethyl) n-decyl sulfide
Di(2-[3,4,5-tri-n-propyl-2-pyridyl]ethyl) sulfide
Di(1-[4-n-pentyl-3-quinolyl]ethyl) sulfide
Di(2-[3,4,5-trimethyl-6-n-heptyl-2-quinolyl]ethyl) sulfide
Di(1-[3-quinolyl]ethyl) sulfide
(2-[7-n-decyl-4-quinolyl]ethyl) isoporpyl sulfide
Di(2-[5-ethyl-2-pyridyl]ethyl) sulfide
(2-[4-tert-doecyl-2-pyridyl]ethyl) tert-dodecyl sulfide The sulfides as described above are oxidized to sulfoxides, sulfones and N-oxides of these sulfoxides and sulfones by contacting with an oxidizing agent selected from the group consisting of hydrogen peroxide and aliphatic peracids containing from 1 to 3 carbon atoms, such as for example, performic and peracetic acid.

This oxidation is carried out at a temperature below the boiling point of the sulfide at the reaction pressure, the preferred reaction temperatures being between 100 and 300° F. The amount of oxidizing agent present will depend upon the desired product, and will be at least 1 atom of peroxygen per mol of sulfide if the sulfoxide is desired, 2 atoms for the sulfone, 3 atoms for the mono-N-oxide of the sulfone, etc.

The oxidation can be carried out by adding a peracid to the sulfide per se, or a solvent for the sulfide can be employed. It is also within the scope of this invention to generate the peracid in situ, that is, add hydrogen peroxide and an acid, such as acetic, to the reaction zone.

At the end of the oxidation, the remaining peroxide and/or peracid is neutralized by the addition of a suitable agent, as for example, sodium carbonate. The oxidation product, whether it be sulfoxide, sulfone, N-oxides of these materials or mixtures of these materials, can then be recovered by various methods. The materials can be extracted from the reaction mixture by means of a suitable solvent, such as chloroform. It can then be recovered by such means as distillation, crystallization and the like.

Accordingly, the following equations illustrate how various sulfoxides, sulfones, and N-oxides of these materials can be obtained by following the above-described procedure.

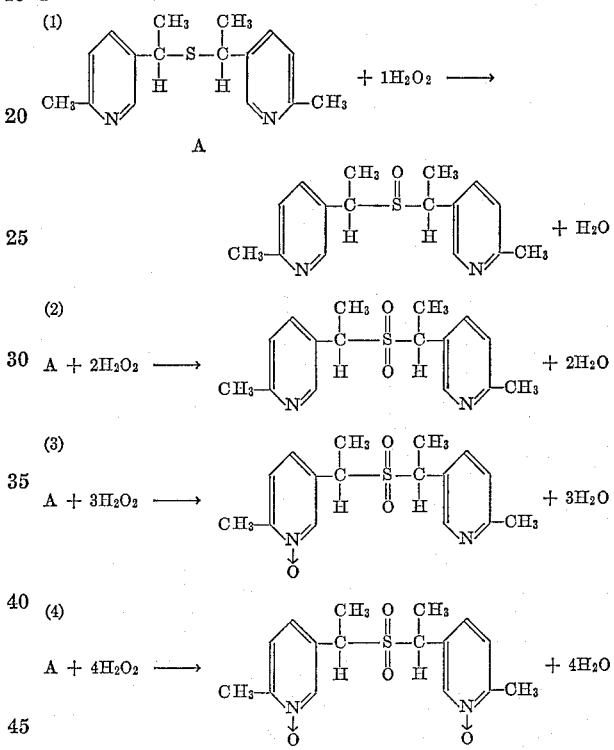

Thus, it can be seen that a wide variety of new compounds can be prepared by operating according to the present invention.

Some examples of specific compounds which can be prepared according to the method of this invention are:

Di(1-[2-methyl-5-pyridyl]ethyl) sulfone
Di(1-[2-methyl-5-pyridyl]ethyl) sulfone mono-N-oxide
Di(1-[2-methyl-5-pyridyl]ethyl) sulfone di-N-oxide
Di(1-[2-methyl-5-pyridyl]ethyl) sulfoxide
Di(2-[2-methyl-4-pyridyl]ethyl) sulfone and its mono- and di-N-oxides
Di(2-[6-n-decyl-2-quinolyl]ethyl) sulfone
Di(1-[7-n-butyl-3-quinolyl]ethyl) sulfoxide
(2-[3,4,5,6,7-pentaethyl-2-quinolyl]ethyl) n-decyl sulfone mono-N-oxide
(2-[3,5-di-n-propyl-4-pyridyl] ethyl methyl sulfone di-N-oxide
Di(2-[2,3-di-n-pentyl-4-pyridyl]ethyl) sulfoxide

*Example*

A run was carried out in which 2-methyl-5-vinylpyridine (MVP) was reacted with hydrogen sulfide. In this run, 1.01 mols (120 grams) of MVP and 0.24 gram of sulfur were charged to a 500 ml. autoclave which was then cooled in an ice bath. Hydrogen sulfide (1.17 mols) was then charged to the autoclave, resulting in a pressure of 200 p.s.i.g. The pressure began decreasing almost immediately. The mixture was slowly heated to 180° F. over a period of two hours and the pressure began to drop, so the mixture was then heated to 270° F. after which it was cooled, and unreacted hydrogen sulfide was vented off. Upon cooling, the reaction mixture partially solidified. Recrystallization of this material from ether resulted in the recovery of 30 grams of a white solid which melted at 202–205° F. (94.5–96° C.). After again recrystallizing this material, the melting point was 208–210° F. (98–99° C.). Attempts to distill the liquid reaction residue under reduced pressure resulted in decomposition with the evolution of hydrogen sulfide and some MVP.

Several other attempts were made to distill the liquid reaction products from other runs, but none of these runs resulted in the production of 2-methyl-5-(2-mercaptoethyl) pyridine. None of the distillate fractions gave a positive test for mercaptans with isatin.

An elemental analysis of the material melting at 208–210° F. gave the following results: carbon—70.5 weight percent, hydrogen—7.4 weight percent, nitrogen—10.32 weight percent and sulfur—11.77 weight percent. The calculated values for $C_{16}H_{20}N_2S$ are: carbon—70.3 weight percent, hydrogen—8.2 weight percent, nitrogen—11.0 weight percent and sulfur—11.8 weight percent. Reaction of this compound with perchloric acid to form the diperchlorate indicated an equivalent weight of 136.7. The calculated equivalent weight of the compound (½ of $C_{16}H_{20}N_2S$) is 136.2. Thus, the compound prepared was:

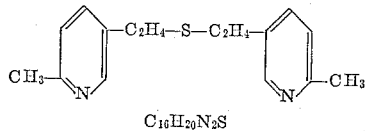

$C_{16}H_{20}N_2S$

The sulfide, prepared as described above, was then oxidized in the following manner.

6.06 grams (0.0222 mol) of the sulfide (M.P. 208–210° F.) were placed in a flask fitted with a reflux condenser, stirrer, thermometer and addition burette. To this material was then added 25 ml. of glacial acetic acid, after which the mixture was heated to 220° F. and 0.0444 mol of $H_2O_2$ was slowly added (as 30 percent by weight aqueous solution). The addition of $H_2O_2$ was at such a rate that the reaction temperature of 216–224° F. was maintained with but little external heating. The reaction mixture was maintained at this temperature for 20 minutes after completion of the $H_2O_2$ addition. The mixture was then allowed to cool to room temperature. Most of the acetic acid was then removed by vacuum distillation.

The reaction mixture was then treated with excess anhydrous sodium carbonate and stirred for 20 minutes, after which 20 cc. of chloroform was added. After warming to complete the evolution of $CO_2$, most of the chloroform was removed under reduced pressure. This caused a precipitate to form. Isopropyl alcohol was added until the precipitate dissolved when heated nearly to boiling. Charcoal was then added and, after stirring for 1–2 minutes, the hot mixture was filtered. When the filtrate was cooled, crystals formed. The crystals were filtered out and washed with cold isopropyl alcohol. The yield, after drying, was 1.54 grams of material melting at 259–262° F. (126–128° C.). After two more recrystallizations, the material melted at 260–262.5° F. (127.5–128.5° C.). This compound was

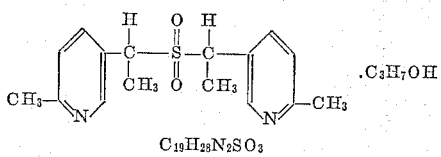

$C_{19}H_{28}N_2SO_3$

It was shown by infrared analysis that the sulfur atom in this compound was attached to the two carbons of the ethyl group which were attached to ring carbons of the heterocyclic ring. The calculated carbon and hydrogen contents for this compound are C—62.6 weight percent and H—7.75 weight percent. The percentages, as determined by elemental analysis, were C—62.5 weight percent and H—7.78 weight percent. When heated to 275° F. (135° C.), it was apparent that a material was distilling off. An 0.8 gram sample yielded a distillate of 0.13 gram which was identified as isopropyl alcohol. Thus, the material formed a complex with isopropyl alcohol. After the isopropyl alcohol was driven off, the material melted at 321–324° F. (160.5–162° C.).

In still another run, 6.06 grams (0.0222 mol) of the sulfide from MVP and $H_2S$ were charged to the apparatus described above and 25 ml. of glacial acetic acid were added. The mixture was then heated to 221° F. (105° C.) and 10.1 grams of 30 percent by weight aqueous $H_2O_2$ (0.0888 mol) were added dropwise with stirring. The mixture was then heated for 15 minutes, and then an additional 2.67 grams of 30 percent $H_2O_2$ (0.0236 mol) were added dropwise. The mixture was then heated to 212–221° F. for 30 minutes, after which approximately ⅔ of the volume was removed by distillation under reduced pressure. Approximately 10 ml. of distilled water were then added, and the mixture was again concentrated to approximately the same volume by distillation under reduced pressure. Twenty ml. of chloroform were then added and sufficient sodium carbonate was added to neutralize the remaining acetic acid. The mixture separated into a liquid phase and a semi-solid phase, the latter gradually solidifying. The liquid phase was then decanted, dried over $MgSO_4$, treated with charcoal, heated, and filtered. The filtrate was concentrated by evaporation until only a small amount of liquid remained. The solid that formed on cooling was filtered out, and subsequently recrystallized from isopropanol. After two more recrystallizations from isopropanol, a shiny white solid made up of platelets was recovered. An initial melting point of 206.5° F. (97° C.) was observed, with some distillation similar to that of the previous run, taking place. Further heating showed a later M.P. of 356–360° F. (180–182° C.).

The material melting at 206.5° F. (97° C.) was examined by infrared analysis and found to contain a sulfone linkage and that the sulfur was connected to the 1 carbon of the ethyl group. An elemental analysis of this material showed it to contain 60.3 percent by weight carbon and 7.08 percent by weight hydrogen.

Thus, the chemical formula for the compound is:

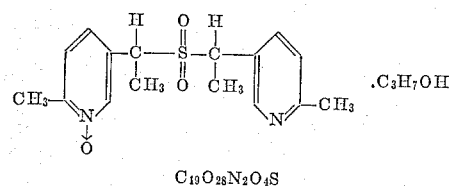

$C_{19}O_{28}N_2O_4S$

The calculated carbon content for this compound is 60.0 weight percent, and the calculated hydrogen content is 7.37 weight percent.

The novel sulfides of this invention are useful as intermediates in the formation of the sulfones and sulfoxides disclosed herein. The novel sulfoxides, sulfones and N-oxides of sulfoxides and sulfones of N-heterocyclic compounds are useful as insecticides, insect repellents and as intermediates for pharmaceuticals.

Reasonable variation and modification are possible within the scope of the foregoing disclosure and appended claims, the essence of which is novel compounds comprising sulfides of 3-vinylpyridine, 5-vinylpyridine and 3-vinylquinoline and comprising sulfoxides, sulfones, and N-oxides of sulfoxides and sulfones of N-heterocyclic compounds and methods for preparing by contacting vinyl-substituted N-heterocyclic compounds with hydrogen sulfide or alkyl mercaptans and oxidizing the resulting sulfides.

I claim:
1. A compound of the formula

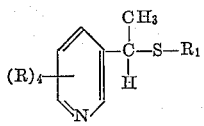

wherein R is an alkyl, the total carbon atoms in (R)$_4$ being not more than 12, and R$_1$ is selected from the group consisting of

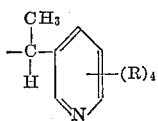

and a 1 to 12 carbon alkyl.

2. A compound selected from the group consisting of sulfoxides, sulfones, and N-oxides of sulfones of

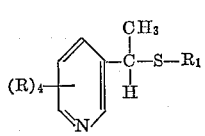

wherein R is an alkyl, the total carbon atoms in (R)$_4$ being not more than 12, and R$_1$ is selected from the group consisting of

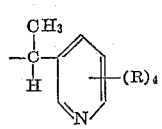

and a 1 to 12 carbon alkyl.

3. Di(1-[2-methyl-5-pyridyl]ethyl) sulfone.
4. Di(1-[2-methyl-5 - pyridyl]ethyl) sulfone mono-N-oxide.
5. Di(1-[2-methyl-5-pyridyl]ethyl) sulfone di-N-oxide.
6. Di(1-[2-methyl-5-pyridyl]ethyl) sulfoxide.
7. Di(-1-[2-methyl-5-pyridyl]ethyl) sulfide.
8. A method of preparing an oxygen-containing compound selected from the group consisting of sulfoxides, sulfones, and N-oxides of sulfones, which comprises: contacting a vinylpyridine with a compound selected from the group consisting of hydrogen sulfide and a 1 to 12 carbon atom alkyl mercaptan to produce a sulfide of the formula

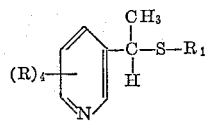

wherein R is selected from the group consisting of hydrogen and an alkyl, the total carbon atoms in (R)$_4$ being not more than 12, and R$_1$ is selected from the group consisting of

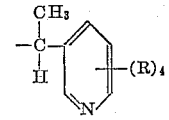

and a 1 to 12 carbon alkyl; and contacting said sulfide with an oxidizing agent selected from the group consisting of hydrogen peroxide and a 1 to 3 carbon atom saturated aliphatic peracid.

9. A method for preparing aسulfide of the formula

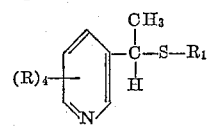

wherein R is selected from the group consisting of hydrogen and an alkyl, the total carbon atoms in (R)$_4$ being not more than 12, and R$_1$ is selected from the group consisting of

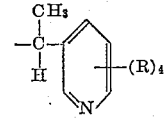

and a 1 to 12 carbon alkyl, which comprises: contacting a vinylpyridine with a compound selected from the group consisting of hydrogen sulfide and a 1 to 12 carbon alkyl mercaptan.

10. The method of claim 9 wherein the temperature is at least 100° F. and the pressure sufficient to maintain the N-heterocyclic compound in the liquid phase at the reaction temperature, and is at least 50 p.s.i.g.

References Cited in the file of this patent
UNITED STATES PATENTS

| | | |
|---|---|---|
| 2,429,096 | Ladd | Oct. 14, 1947 |
| 2,607,776 | Vinton | Aug. 19, 1952 |
| 2,742,476 | Bernstein et al. | Apr. 17, 1956 |

OTHER REFERENCES

Thompson et al.: Industrial and Engineering Chemistry, vol. 44 (1952), pages 1659–1662.
Achmatowicz et al.: Chem. Abstr., volume 50, page 12046 (1956).
Hansch et al.: J. Organic Chem., vol. 22, pages 936–939 (1957).
Maruszewaka et al.: Roczniki Chemie, vol. 31, pages 543–551 (1957).